United States Patent [19]

Gould et al.

[11] Patent Number: 4,520,037

[45] Date of Patent: May 28, 1985

[54] EDIBLE EMULSION HAVING AN IMPROVED MICROBIOLOGICAL STABILITY

[75] Inventors: Grahame Gould, Bedford; Anthony Crossley, Letchworth; David P. J. Moran, Covington, all of England

[73] Assignee: Lever Brothers Company, New York, N.Y.

[21] Appl. No.: 511,406

[22] Filed: Jul. 7, 1983

[30] Foreign Application Priority Data

Jul. 8, 1982 [GB] United Kingdom ............... 8219846

[51] Int. Cl.$^3$ ........................... A23D 3/04; A23D 5/04
[52] U.S. Cl. ............................... 426/330.6; 426/602; 426/603; 426/604
[58] Field of Search ............... 426/330.6, 602, 603, 426/605, 613

[56] References Cited

U.S. PATENT DOCUMENTS

| | | | |
|---|---|---|---|
| 3,917,859 | 11/1975 | Terada et al. | 426/613 X |
| 4,145,451 | 3/1979 | Oles | 426/602 X |
| 4,305,970 | 12/1981 | Moran et al. | 426/603 |
| 4,366,180 | 12/1982 | Altrock et al. | 426/613 X |

*Primary Examiner*—Robert Yoncoskie
*Attorney, Agent, or Firm*—James J. Farrell

[57] ABSTRACT

There is disclosed an edible emulsion comprising at least two differently formulated aqueous phases containing microbiologically labile nutrients and ingredients inhibiting bacterial growth, said aqueous phases being present in the form of discrete, differently formulated drops dispersed in a continuous phase, wherein an effective amount of each ingredient inhibiting bacterial growth is concentrated along with a nutrient in part of the dispersed aqueous drops and none of the nutrients is present unprotected.

24 Claims, No Drawings

EDIBLE EMULSION HAVING AN IMPROVED MICROBIOLOGICAL STABILITY

The present invention relates to an edible emulsion, particularly a water-in-oil emulsion-spread with a reduced fat content which displays an improved shelf stability.

By reduced fat content is understood a level of fat lower than about 85%, and preferably ranging from 30 to 65 by weight.

Water-containing spreads have a limited shelf stability unless specific measures are taken such as adding water-activity depressing agents, acids, preservatives or gelling agents. Adding said ingredients has however disadvantages. Some of them affect the organoleptic properties of the product when the concentration is too high, others increase too much the cost price of the product and last but not least the use of some ingredients is subject to legal restrictions.

There is need of a spread having an improved shelf stability and good organoleptic properties.

According to the present invention an edible emulsion is provided comprising at least two differently formulated aqueous phases containing microbiologically labile nutrients and ingredients inhibiting bacterial growth, said aqueous phases being present in the form of discrete, differently formulated drops dispersed in a continuous phase, wherein an effective amount of each ingredient inhibiting bacterial growth is concentrated along with a nutrient in part of the dispersed aqueous drops and none of the nutrients is present unprotected.

The present invention particularly relates to water-in-oil emulsion-spreads wherein the differently formulated aqueous phases are dispersed in a continuous plastic fat phase, i.e. a fat phase which contains sufficient crystallized fat at ambient temperature to obtain a spread which can be packed in a tub or in a wrapper. Said continuous fat phase preferably constitutes 30-65% by weight of the total emulsion. Below 30 wt.% of fat the level of aqueous phase will be relatively high and microbiological stabilisation difficult to achieve. In spreads with a level of fat above 65 wt.% the principle of the present invention can perfectly be applied but is less relevant, since microbiological stability is less of a problem and it can be achieved by simpler means.

In the case where intermingling and coalescence of the differently formulated drops of aqueous phases constitute a problem after a long period of storage or during transport, it is important that the emulsion contains an ingredient, for instance an emulsifier, preventing intermingling and coalescence of the drops.

This can be achieved by electrostatic repulsion, or by a component imparting steric hindrance thereby preventing dispersed drops to collide and coalesce, or by applying specific processing conditions as illustrated further in the specification. A particularly useful class of emulsifiers in that respect are the polyglycerol fatty acid esters.

The microbiologically labile nutrients in the emulsions according to the invention may comprise proteins such as milk proteins or vegetable proteins, carbohydrates such as glucose, lactose or products obtained by partially hydrolysing starch.

Ingredients inhibiting bacterial growth may consist of acids such as hydrochloric acid, acetic acid, lactic acid, phosphoric acid; preservatives such as benzoic acid, sorbic acid; water-activity depressing agents such as salts e.g. sodiumchloride, alkali metal phosphates or any substance increasing the osmotic pressure.

According to a specific embodiment of the present invention one aqueous phase is present in the form of discrete drops (i) containing a salt and a nutrient and another aqueous phase is present in the form of discrete drops (ii) containing an acid and a nutrient.

The preferred salt is sodium chloride and its preferred concentration is 6-12 wt.% (based on aqueous phase (i). The acid present in drops (ii) is present in a concentration sufficient to achieve a pH ranging from 1.5 to 5.5, preferably from 2.0 to 4.7.

Nutrients are preferably put together with compatible ingredients inhibiting bacterial growth i.e. ingredients which do not substantially affect the physical or chemical nature of the nutrients or, put in other words, ingredients which do not cause degradation of the nutrients.

According to an embodiment of the present invention a protein is present as one of the nutrients in drops (i), i.e. the drops containing salt and no acid, in order to avoid possible denaturation of the protein.

However, in the case where whey protein is used, a lower pH is also acceptable, e.g. a pH between 3.0 and 4.7.

Water-soluble or -dispersible components, particularly nutrients of the emulsion, are concentrated in a proportion of the total amount of the aqueous phase, e.g. 5-75% of the total amount of the aqueous phase, whereby especially at the lower end of the range the concentration of solutes could be such that no additional specific bacterial growth inhibiting agents are required because of the prevailing, low water-activity.

It is also possible that the spread comprises further drops (iii) of a third aqueous phase which is substantially free from nutrients and ingredients inhibiting bacterial growth, and may consist of pure water.

The porportion of each of the various aqueous phases can vary within a wide range e.g. from 5-75%. It is however preferable to select proportions allowing the presence of a relatively high concentration of the water-activity depressing agent e.g. the salt or of the acid in that part of the aqueous phase where it is most required, while maintaining its overal concentration in the total emulsion within the range dictated by organoleptic considerations.

The present invention also provides a process for producing emulsions as defined hereinbefore, comprising: dispersing in a continuous phase at least two differently formulated aqueous phases containing microbiologically labile nutrients and ingredients inhibiting bacterial growth, in the form of discrete, differently formulated drops, while ensuring that an effective amount of each ingredient inhibiting bacterial growth is concentrated along with a nutrient in part of the dispersed aqueous drops and that none of the nutrients is present unprotected. The protection confered on the nutrients can be attributable to the addition of any of the ingredients inhibiting growth described above or to a high degree of dispersion i.e. a droplet size of less than 5 microns and preferably less than 2 microns.

A preferred way of producing spreads according to the invention involves: (a) producing at least two separate differently formulated aqueous phases wherein in each of said phases a nutrient and an ingredient inhibiting bacterial growth is concentrated; (b) dispersing each of said aqueous phases in a plastic fat phase to obtain at least two separate emulsions, (c) separately cooling and texturising said emulsions, preferably in a Votator-apparatus; and (d) mixing the texturised emulsions applying a mild shear regime, preferably in a static mixer, to prevent intermingling of the various differently formulated aqueous phase-drops.

Each of the aqueous phases may contain one or more nutrients and one or more ingredients inhibiting bacterial growth, which are compatible with the nutrients.

According to a preferred method of performing the process according to the invention a further step (e) is included, involving recirculating each of the emulsions obtained in step (c) into separate containers, prior to intermixing the emulsions in step (d).

It is also possible to carry out a process comprising a further recirculation step (f) involving recirculation as a single phase of at least one of the aqueous phases into separate containers prior to emulsification and intermixing.

This procedure is particularly useful when the aqueous phase consists of a cream which cannot tolerate over-working, which may occur in the case where recirculation has to be carried out, e.g. when the packaging machine breaks down.

The emulsions as hereinbefore described, which ar obtainable according to a process as described above, display an improved microbiological stability in comparison with emulsions wherein the bacterial growth inhibiting ingredients are homogeneously distributed in one single aqueous phase dispersed in the continuous phase. Put in other words: an improved shelf stability is achieved according to the invention at overall levels of the bacterial growth inhibiting ingredients which are equal to or even smaller than the normal levels of the same ingredients.

The invention will now be illustrated in the following example.

EXAMPLE

A fat spread (40% fat) was produced from two aqueous phase.

The first aqueous phase (25 wt.% of the total amount of the aqueous phases) contained 3.3% of whey protein, 8.0% of sodium chloride and 10.7% of $Na_2HPO_4$ and had a pH of 7.0. (All proportions are based on the weight of this aqueous phase).

The second aqueous phase (75% of the total amount of the aqueous phase) contained 3.0% of 1M hydrochloric acid, 0.2% of citric acid, 0.02% of potassium sorbate and 3.3% of whey protein. The pH was 3.0. (All proportions are based on the weight of this aqueous phase).

The first aqueous phase was emulsified in a margarine fat blend consisting of 23% of palm oil hydrogenated to m.p.=43° C., 77% of soybean oil and 2% of an emulsifier consisting of a polyglycerol ester (Homodan PT).

The second aqueous phase was emulsified separately in in the same blend.

Both emulsions were separately cooled and texturized in a Votator apparatus.

The texturized emulsions were combined by gently mixing in a static mixer to obtain the final spread (pH 6.1).

Experimental samples in an accelerated spoilage test were inoculated with about $10^3$ organisms/g, stored at 10° C. and compared with control samples produced starting from the same proportions of the nutrients and ingredients inhibiting bacterial growth as outlined above, which were homogeneously distributed over the whole emulsion instead of being concentrated in separate, differently formulated drops. The resulting pH was 6.1.

The control samples had a count of organisms 1000 times greater than the samples according to the invention following storage.

We claim:

1. An edible emulsion comprising at least two differently formulated aqueous phases containing microbiologically labile nutrients and ingredients inhibiting bacterial growth, said aqueous phases being present in the form of discrete, differently formulated drops dispersed in a continuous plastic fat phase, wherein an effective amount of each ingredient inhibiting bacterial growth is concentrated along with a nutrient in at least part of the total aqueous phase and none of the nutrients is present unprotected.

2. An edible emulsion according to claim 1, wherein the fat phase constitutes 30-65 wt.% of the total emulsion.

3. An edible emulsion according to claim 1, wherein the emulsion contains an emulsifier preventing intermingling and coalescence of the differently formulated drops.

4. An edible emulsion according to claim 3, wherein the emulsifier comprises a polyglycerol fatty acid ester.

5. An edible emulsion according to claim 1, wherein the ingredient inhibiting bacterial growth consists of a water-activity depressing agent, an acid or a preservative.

6. An edible emulsion according to claim 1, wherein one aqueous phase is present in the form of dispersed discrete drops (i) containing a salt and a nutrient, and another aqueous phase is present in the form of dispersed, discrete drops (ii) containing an acid and a nutrient.

7. An edible emulsion according to claim 6, wherein drops (i) contain 6-12% of sodium chloride and a nutrient, and drops (ii) contain a sufficient amount of an acid to achieve a pH ranging from 1.5 to 5.5, and a nutrient.

8. An edible emulsion according to claim 6, wherein the nutrient present in drops (i) is a protein.

9. An edible emulsion according to claim 6, further comprising a third aqueous phase in the form of drops (iii) which are substantially free from nutrients and ingredients inhibiting bacterial growth.

10. An edible emulsion according to claim 1, wherein each of the aqueous phases ranges from 5 to 75 wt.%.

11. A process for producing an edible emulsion according to claim 10, comprising: dispersing in a continuous plastic fat phase at least two differently formulated aqueous phases containing microbiologically labile nutrients and ingredients inhibiting bacterial growth, in the form of discrete, differently formulated drops, wherein an effective amount of each ingredient inhibiting bacterial growth is concentrated along with a nutrient in at least part of the total aqueous phase and that none of the nutrients is present unprotected.

12. A process according to claim 12, wherein the fat phase constitutes 30-65 wt.% of the total emulsion.

13. A process according to claim 11, wherein an emulsifier preventing intermingling and coalescence of the differently formulated drops is incorporated in the emulsion.

14. A process according to claim 13, wherein the emulsifier comprises a polyglycerol fatty acid ester.

15. A process according to claim 11, wherein the ingredient inhibiting bacterial growth consists of a water activity depressing agent, an acid or a preservative.

16. A process according to claim 11, wherein one aqueous phase is dispersed as discrete drops (i) containing a salt and a nutrient and another aqueous phase is dispersed as discrete drops (ii) containing an acid and a nutrient.

17. A process according to claim 16, wherein drops (i) contain 6–12% of sodium chloride and a nutrient and drops (ii) contain a sufficient amount of an acid to achieve a pH ranging from 1.5 to 5.5, and a nutrient.

18. A process according to claim 17, wherein a protein is incorporated in drops (i).

19. A process according to claim 11, wherein each of the aqueous phases ranges from 5 to 75 wt.%.

20. A process according to claim 11, comprising:
  (a) producing at least two separate emulsions by separately dispersing each of said differently formulated aqueous phases in a plastic fatty phase;
  (b) separately cooling and texturizing said emulsions;
  (c) mixing the texturized emulsions by applying a mild shear regime preventing coalescence and intermixing of the differently formulated, dispersed aqueous phases.

21. A process according to claim 20, wherein step (b) is carried out in a Votator apparatus.

22. A process according to claim 20, wherein step (c) is carried out in a static mixer.

23. A process according to claim 22, further comprising a recirculation step (d) involving recirculating each of the emulsions obtained in step (b) prior to intermixing the emulsions in step (c).

24. A process according to claim 22, further comprising a recirculation step (e) involving recirculating as a single stream at least one of the aqueous phases into a separate container prior to emulsification and intermixing.

* * * * *